Feb. 28, 1956 G. L. RUSSELL 2,736,453
STACKING BASKET
Filed Oct. 8, 1951 4 Sheets-Sheet 1

INVENTOR.
GEORGE L. RUSSELL
BY Whittemore,
Hulbert & Belknap
ATTORNEYS

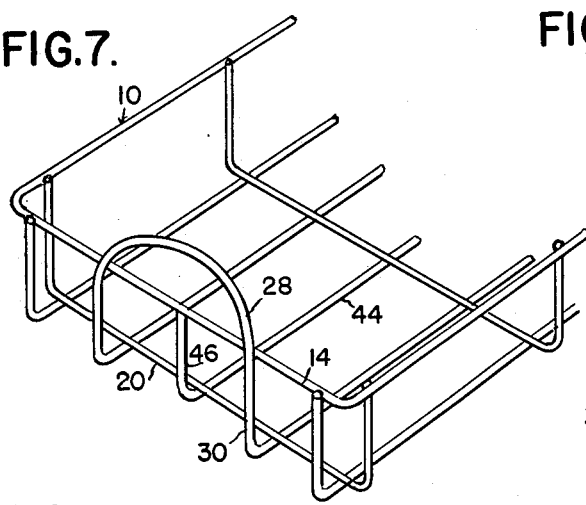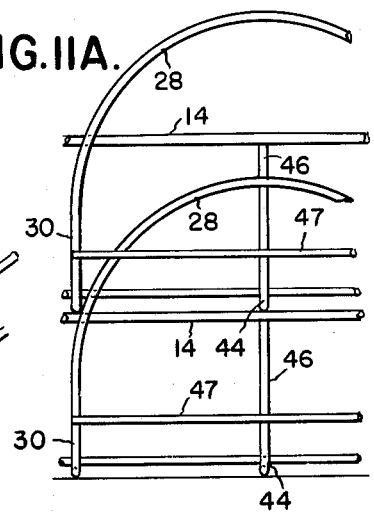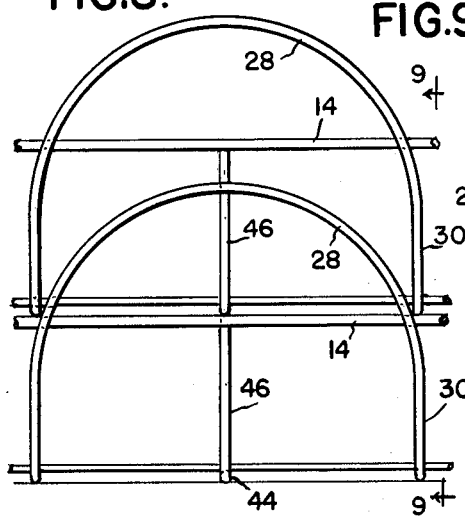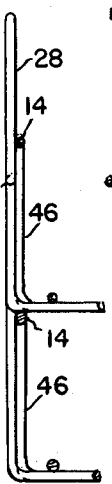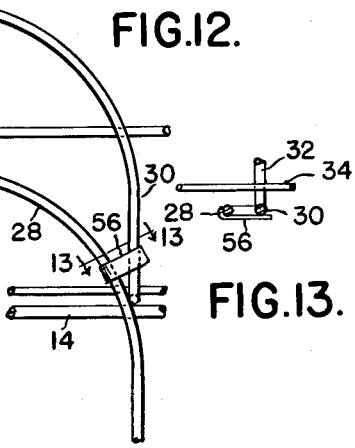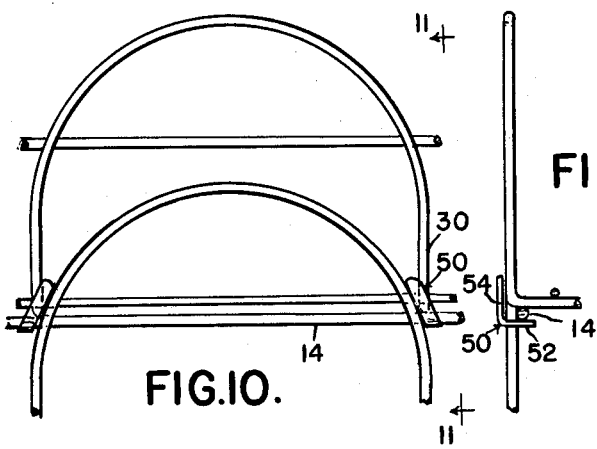

Feb. 28, 1956 G. L. RUSSELL 2,736,453
STACKING BASKET
Filed Oct. 8, 1951 4 Sheets-Sheet 3
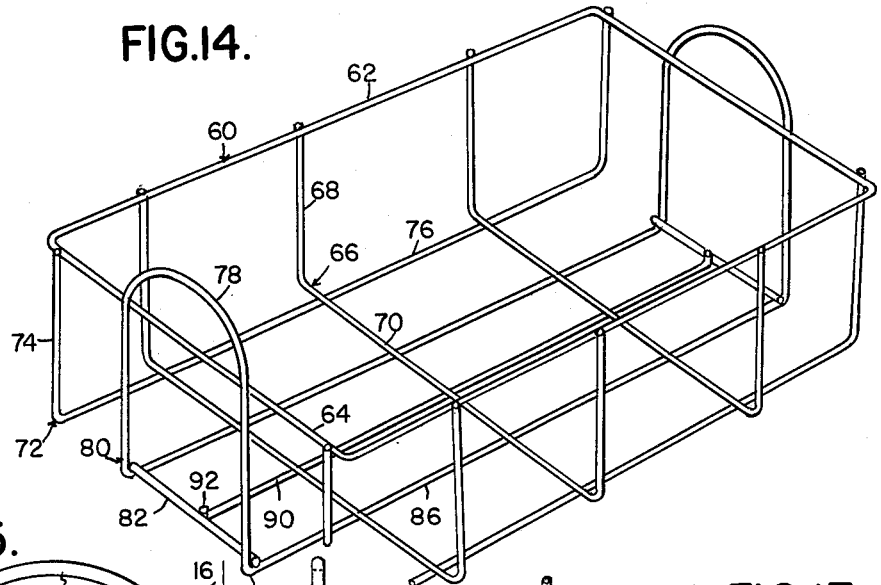
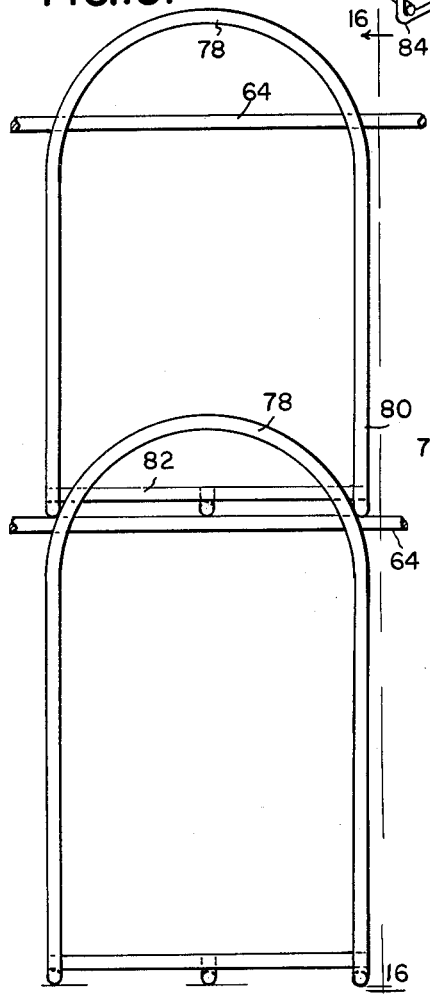
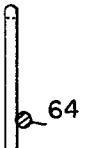
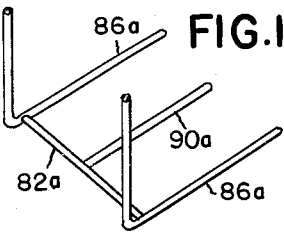
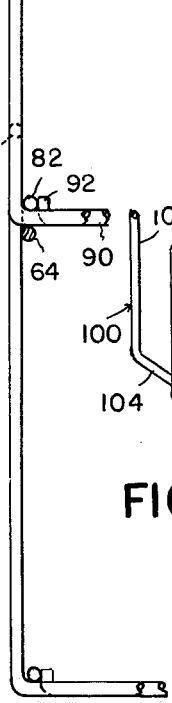
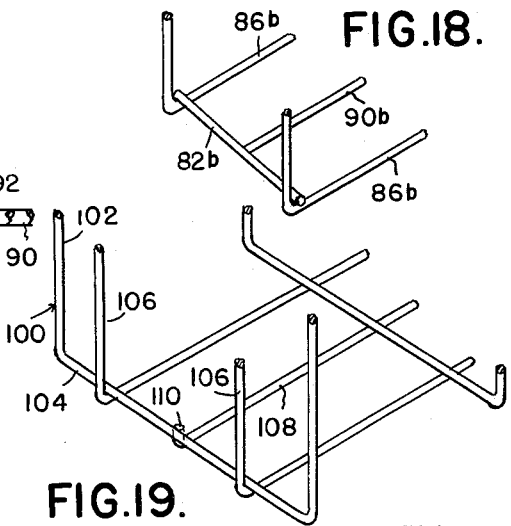
INVENTOR.
GEORGE L. RUSSELL
BY
ATTORNEYS Feb. 28, 1956  G. L. RUSSELL  2,736,453
STACKING BASKET
Filed Oct. 8, 1951  4 Sheets-Sheet 4
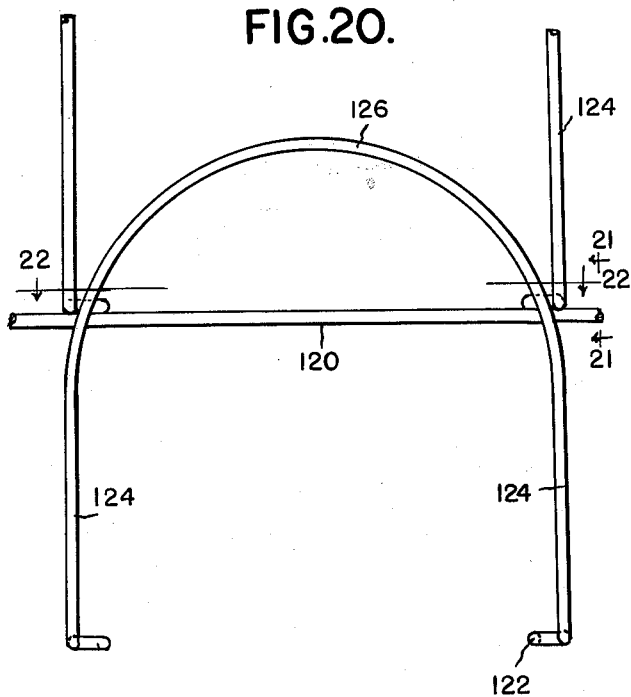
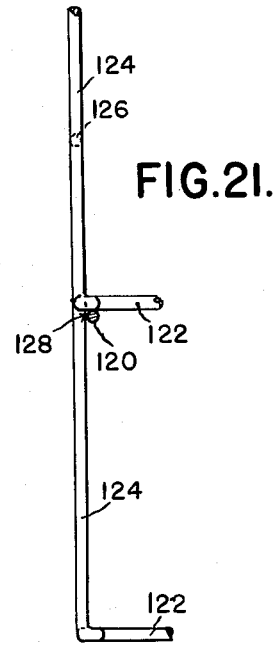
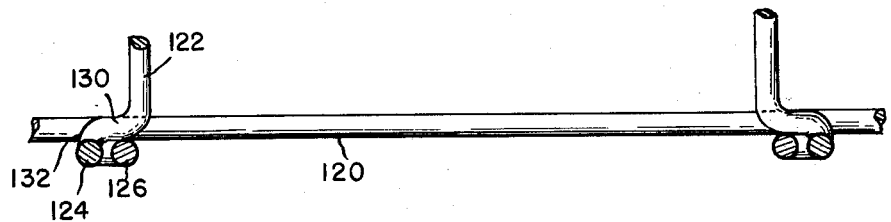
INVENTOR.
GEORGE L. RUSSELL
BY Whittemore,
Hulbert & Belknap
ATTORNEYS United States Patent Office 2,736,453
Patented Feb. 28, 1956

2,736,453
STACKING BASKET

George Lewis Russell, Fair Haven, Mich.; Emily Louise Russell, executrix of said George Lewis Russell, deceased Application October 8, 1951, Serial No. 250,213

5 Claims. (Cl. 220—19)

The present invention relates to a stacking basket.

At the present time stacking baskets are employed in large numbers in manufacturing plants for the purpose of transporting small parts for assembly. The actual construction of the basket is widely varied to accommodate different types of parts. In all cases however, it is essential to include a construction allowing the baskets to be stacked in tiers of considerable height and to interlock the baskets in such a way as to maintain stability of a stack.

The baskets may be handled and transported manually on trucks or on fork or other type conveyors. However, in many cases the assembly of the baskets into a stack or tier is manually accomplished and accordingly it is highly desirable to provide the baskets such that the basket added to the stack may be partially supported on the basket at the top of the stack as the last basket is moved into registration with the top basket of the stack. It is also highly desirable to provide the interlocking or interfitting construction on the basket so that the top basket is positively prevented from moving into a position which is sufficiently close to properly interlocked position as to appear superficially, to be interlocked, whereas in fact the interlocking or interfitting means are not engaged.

All of the foregoing desirable features are included in one or more of the stacking baskets illustrated herein and it is an object of the present invention to provide stacking baskets having the aforementioned functions.

More specifically, it is an object of the present invention to provide stacking baskets in which the handle portions thereof engage with a superimposed basket to establish the interlocking engagement.

It is a further object of the present invention to provide stacking baskets including one or more guide rails or runners adapted to rest upon the handle portion of the next lower basket so as to permit the upper basket to be slid into registration with the lower basket.

It is a further object of the present invention to provide stacking baskets including a guide rail or runner as above described, which is constructed and arranged to prevent movement of the upper basket into stacked relation with the lower basket until it is in position for proper interlocking engagement.

More specifically, it is an object of the present invention to provide stacking baskets including a top border frame, handles at opposite ends of the basket secured tangentially to the outer surfaces of the end portions of the top border frame, and interlocking means disposed substantially tangentially with respect to the inner surfaces of the portions of the handles below the top border frame to engage the inner surfaces of the handles of the next lower basket in the stack.

It is a further object of the present invention to provide a basket of the character described in the foregoing paragraph in combination with a longitudinally extending bottom rail or runner located substantially midway between the sides of the basket and extending substantially from end to end thereof, the end portions of such rail or runner terminating inwardly of the inner surfaces of the handle portions to serve as guide means for partially supporting the weight of a superimposed basket as it is moved into proper registration with the next lower basket in the stack.

Other objects and features of the invention will become apparent as the description proceeds, especially when taken in conjunction with the accompanying drawings, wherein:

Figure 7 is a fragmentary perspective view of another embodiment of the present invention.

Figure 8 is a fragmentary end elevation of a pair of baskets of the type disclosed in Figure 7, in stacked relation.

Figure 9 is a fragmentary section on the line 9—9, Figure 8.

Figure 10 is a fragmentary end elevation of a pair of stacked baskets illustrating a modified interlocking construction.

Figure 11 is a fragmentary section on the line 11—11, Figure 10.

Figure 11A is a view similar to Figure 8, showing a modified form of basket.

Figure 12 is a fragmentary end elevation of a pair of stacked baskets illustrating another modified construction of interlocking means.

Figure 13 is a fragmentary section on the line 13—13, Figure 12.

Figure 14 is a fragmentary perspective view of a modified basket construction.

Figure 15 is a fragmentary end elevation showing a pair of baskets of the type illustrated in Figure 14, in stacked relation.

Figure 16 is a fragmentary section on the line 16—16, Figure 15.

Figure 17 is a fragmentary perspective view illustrating a modified construction of basket.

Figure 18 is a fragmentary perspective view illustrating yet another modified construction of basket.

Figure 19 is a fragmentary perspective view illustrating yet another modified construction of basket.

Figure 20 is a fragmentary end elevation of a pair of baskets of modified construction in stacked relation.

Figure 21 is a section on the line 21—21, Figure 20.

Figure 22 is an enlarged section on the line 22—22, Figure 20.

Figure 1:
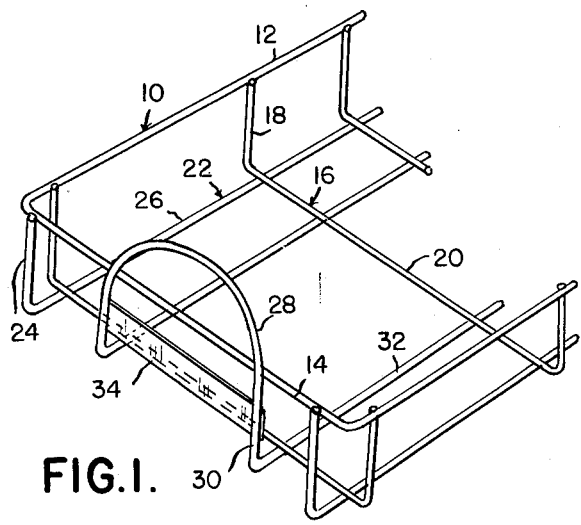
Figure 1 is a fragmentary perspective view of a basket constructed in accordance with the present invention.

The basket illustrated in Figure 1 comprises a frame including a top border wire 10 having longitudinally extending side portions 12 and transversely extending end portions 14. The basket includes a plurality of frame members 16 of generally U-shaped configuration including vertical legs 18 secured at their tops to the side portions 12 of the top border wire and including transversely extending bottom portions 20. The basket also includes longitudinally extending frame members 22 of generally U-shaped configuration which include vertical legs 24 secured at their ends to the top border frame and including longitudinally extending bottom portions 26. The basket also includes handles 28 located substantially midway between the ends of end portions 14 of the top border frame. The handle 28 is disposed substantially tangentially of the outer surface of the transverse end portion 14 of the top border frame. The baskets are provided with generally vertically extending end supports 30 extending downwardly from the transverse end portion 14 of the top border frame and substantially coplanar with the handles 28. Conveniently, the handles 28 and end supports 30 may be formed of a single piece of wire of inverted U-shape and preferably, the bottom ends of the end supports are interconnected by longitudinally extending runners 32. Conveniently, the handles 28, end supports 30, and runners 32 may all be formed of a single wire or may be formed of two pieces of wire, the ends of which are welded together in end-abutting relation.

Disposed substantially tangentially of the inner surface of the end supports 30 and adjacent the lower ends thereof are transversely extending interlock members 34 which are herein illustrated as flat metal straps or wires.

The dimension between the outer surfaces of the handles 28 directly above the border wire portion 14 is substantially equal to the dimension between the transverse inner surfaces of the end supports 30 adjacent their lower ends. As a result of this construction, a pair of baskets of the type shown in Figure 1 may be stacked together as seen in Figures 2 and 3, and when so stacked are positively supported against relative transverse movement in any direction, so that a stable stack or tier of considerable height may be constructed.

Figure 2:
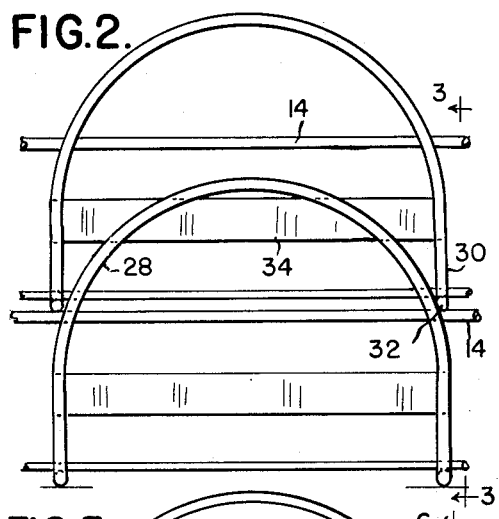
Figure 2 is a fragmentary end elevation of a pair of baskets of the type disclosed in Figure 1, in stacked relationship.
Figure 3:
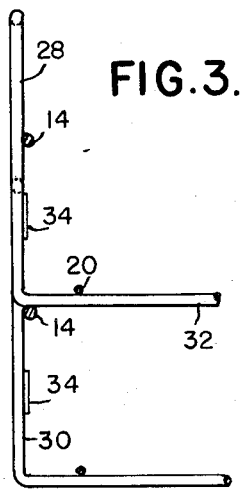
Figure 3 is a fragmentary sectional view on the line 3—3, Figure 2.

As best seen in Figure 2, the handle 28 of the lower basket fits snugly between the lower ends of the end supports 30 of the upper basket. At the same time the runners 32 of the upper basket rest upon the transverse end portion 14 of the top border frame of the lower basket. Thus, the upper basket is supported on the border frame of the lower basket and the interlocking engagement between the handles and their supports as described, effectively prevents relative transverse movement between the baskets. The interlock members 34, as best seen in Figures 2 and 3, engage the longitudinally inner surfaces of the handles 28 of the lower basket, and thus effectively prevent relative longitudinal movement between the assembled baskets. The provision of the interlock member 34 tangentially of the longitudinally inner surfaces of the end supports 30 avoids increasing the overall outside dimensions of the baskets and at the same time provides an effective and efficient interlock.

Figure 4:
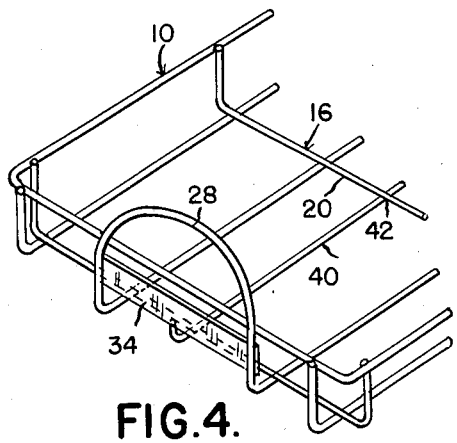
Figure 4 is a fragmentary perspective view of another embodiment of the present invention.
Figure 5:
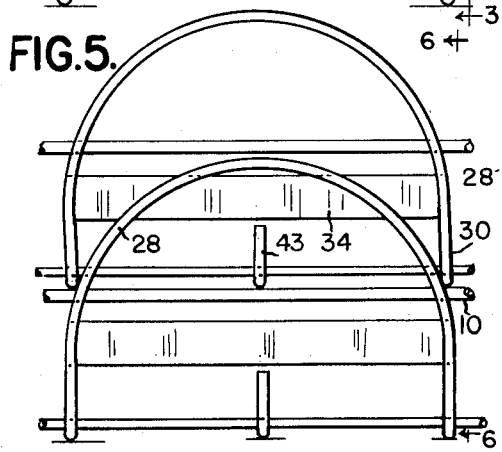
Figure 5 is a fragmentary end elevation of a pair of baskets of the type disclosed in Figure 4, in stacked relation.
Figure 6:
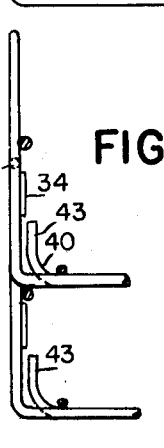
Figure 6 is a fragmentary section on the line 6—6, Figure 5.

Referring now to Figures 4, 5, and 6 there is illustrated a second stacking basket which is generally of the same type as disclosed in Figure 1 with one important modification. Accordingly, reference numerals applied to Figures 4–6 are the same as applied to Figures 1–3. In the basket illustrated in Figures 4–6 there is provided an intermediate guide rail or runner 40 which extends longitudinally of the basket and is welded or otherwise secured as indicated at 42, to the bottom portions 20 of the frame members 16. A pair of baskets of the type disclosed in Figure 4 are shown in stacked relation in Figures 5 and 6, and it will be observed that the interlock provided between the handles 28 and the interlock members 34 is exactly the same as in the embodiment of the invention first described. Furthermore, the engagement between the handles 28 of the lower basket and the end supports 30 of the upper basket is the same as previously described. However, the addition of the longitudinally extending rail or runner 40 introduces a new and important function. As best seen in Figure 6, the ends of the rail 40 are turned upwardly and the outer surface of the turned up end portions 43 are closely adjacent to the longitudinally outer surfaces of the interlock member 34.

As a result of this construction a basket to be added to a stack may initially be supported with its intermediate rail or runner 40 resting upon one of the handles 28 of the top basket of the stack. This relieves the workman of a substantial portion of the weight of the basket. With the basket thus partially supported, the workman slides the upper basket longitudinally until the upwardly turned end portion 43 of the bottom rail or runner reaches the handle 28 of the lower basket. At this time the upper basket is in longitudinal registration with the lower basket. The upper basket is then permitted to move downwardly into interlocked relation with the lower basket. At this time if the baskets are slightly out of transverse or lateral registration, the rounded contour of the handles 28 will insure guiding the upper basket laterally into proper registering relation. The intermediate rail or runner 40 also serves the important function of preventing movement of the upper basket into an apparent interlock position in which the interlocking elements are not properly engaged.

Referring now to Figures 7–9 there is illustrated yet another embodiment of the present invention. In this embodiment of the invention most of the parts of the basket are the same as in the embodiments previously described and like reference numerals have been applied where applicable. In this construction however, the transverse interlock member 34 is omitted and its function is performed by a portion of a special intermediate rail or runner 44. In this construction the intermediate rail or runner 44 has its end portions 46 turned upwardly and connected to the center of the transverse end portions 14 of the top border frame 10. As seen in the figures, the upturned end portions 46 of the intermediate rail or runner 44 are abutted against the lower side of the frame portion 14 and welded thereto. It will be recalled that the handle 28 and end supports 30 are coplanar and are substantially tangent to the longitudinally outer surface of the end portions 14 of the top border frame 10. Accordingly, it will be apparent that the vertically extending end portions 46 of the longitudinal rail or runner 44 are coplanar with the end frame portions 14. In other words, the longitudinally outer surfaces of the vertical portions 46 of the rail or runner are substantially tangent to the longitudinally inner surfaces of the handle 28 and end supports 30.

The manner in which the baskets of Figure 7 interlock in stacked relation is illustrated in Figures 8 and 9. In these figures it will be observed that the handle 28 of a lower basket fits snugly between the lower portions of the end supports 30. Relative longitudinal movement between the baskets is prevented by engagement between the top central portion of the handle 28 and the vertically extending portion 46 of the rail or runner.

It will be observed that the three embodiments of stacking baskets illustrated in Figures 1–9 are all adapted to stack with each other. In the three embodiments of the invention so far described longitudinal relative motion between the baskets is prevented in the embodiments illustrated in Figures 1–6 by the transverse interlock member 34. In the embodiment illustrated in Figures 7–9 relative longitudinal movement is prevented specifically by the vertical portion 46 of the longitudinal rail or runner 44.

In Figures 10–13 there is illustrated a modified arrangement in which relative longitudinal movement between baskets is prevented by an element carried by the lower basket in the stack and engaging with a portion of a superimposed basket. In Figures 10 and 11 the interlock is provided by a pair of abutment members 50 secured to the end portions 14 of the top border frame and disposed to extend outwardly to engage the lower portions of the end supports 30. As best seen in Figure 11, the abutments 50 may comprise a horizontal leg 52 welded or otherwise secured to the under-surface of the end portion 14 of the frame and a vertical leg 54.

In Figures 12 and 13 there is illustrated a modified construction in which abutment members 56 are provided which are secured at one end to the handles 28 above the transverse end portion 14 of the border frame.

The abutments 56 extend outwardly and engage against the longitudinally outer surfaces of the end supports 30.

In the embodiments illustrated in Figures 10–13 it will be observed that interlock members 50 and 56 also serve the function of supporting the longitudinally extending runners connecting the lower ends of the end supports 30 as the upper basket is slid longitudinally into registration with the lower basket.

Referring now to Figures 14–16 there is illustrated another embodiment of the present invention. This construction is generally similar to that previously described but since it is differently proportioned, different reference numerals are applied thereto. The basket comprises an upper border frame 60 including longitudinally extending side portions 62 and transverse end portions 64. The border frame 60 is connected by transverse frame members 66 including vertical legs 68 welded or otherwise secured at their top to the top border frame, and interconnected by a transverse bottom portion 70. Longitudinally extending frame members 72 are provided including vertically extending legs 74 interconnected at the top to the top border frame and including longitudinally extending bottom portions 76. The basket includes handles 78 which are welded or otherwise secured to the longitudinally outer surfaces of the transverse portion 64 of the top border frame. Also, the baskets include end supports 80 which are coplanar with the handles 78 and which conveniently may be formed integrally therewith. Again, the transverse outer surfaces of the handles 78 directly above the transverse portion 64 of the top border frame are spaced apart a distance substantially equal to the spacing between the transversely inner surfaces at the bottom of the end supports 80 so as to interfit in the manner best illustrated in Figure 15.

Interlock members 82 are provided which as illustrated, are in the form of wires welded or otherwise secured at their ends to the longitudinally inner surfaces of the end supports 80 adjacent the lower ends thereof. Actually, interlock members 82 may be welded to the curved elbows 84 providing the junction between end supports 80 and the longitudinal rails or runners 86 which may be formed integral with the end supports and handle. Interlock members 82 are thus disposed with their outer surfaces substantially tangent to the longitudinal inner surfaces of the handles 78 and end supports 80. Thus, when the baskets are stacked as illustrated in Figures 15 and 16, interlock members 82 abut against the inner surfaces of the handles 78 and thus effectively prevent relative longitudinal movement between a pair of stacked baskets.

Preferably, an intermediate guide rail or runner 90 is provided which as illustrated has upturned end portions 92 welded or otherwise secured to the longitudinal inner surfaces of the interlock members 82. Guide rail or runner 90 serves the same function as the rail or runner 40 previously described, and permits the basket being added to the stack to be partially supported and guided into registration with the lower basket.

In Figure 17 there is illustrated a modified construction in which the longitudinal guide rail or runner 90a has its end abutting the transverse interlock member 82a. As a result of this construction members 90a and 82a are all coplanar. Moreover, the ends of the interlock member 82a are abutted and welded or otherwise secured to the longitudinal rails or runners 86a. It will be apparent that interlock members 82a are thus in a position to engage against the longitudinally inner surfaces of the handles of the next lower basket in the stack.

In Figure 18 there is illustrated a slightly modified construction in which the intermediate longitudinal rail or runner 90b is coplanar with the transverse interlock member 82b and has its end abutted and welded or otherwise secured thereto. However, the transverse interlock member 82b is disposed above the rail or runner members 86b so that members 82b and 90b are disposed above the plane established by the runners 86b. In this case also interlock member 82b is positioned to abut against the longitudinally inner surfaces of the handles of the next lower basket in the stack.

In Figure 19 there is illustrated a further modification of the basket. In this case the basket includes a transverse U-shaped frame element 100 having vertical legs 102 and a horizontal connecting portion 104. The frame element 100 is located at the extreme end of the basket such that the transverse bottom portion 104 thereof is located substantially tangent to the longitudinally inner surfaces of the end supports 106. The basket is provided with a central longitudinal rail or runner 108 having its end portions 110 upturned and welded or otherwise secured to the inner surface of the bottom portion 104 of the frame element 100. The part of the bottom portion 104 which extends intermediate the end supports 106, serves as the interlock member and is in position to abut against the longitudinal inner surface of the handle of the next lower basket in the stack.

In Figures 20–22 there is illustrated another embodiment of the present invention. In this case each basket includes a generally rectangular top border frame element 120 and secured thereto is a construction comprising a pair of longitudinally extending bottom runners 122, end supports 124, and looped handle portions 126. Conveniently, the runners, end supports and handles may be formed from a single piece of wire or two pieces suitably interconnected at their ends. Each looped handle portion 126 connects the upper ends of a pair of end supports 124 and the end supports and handle portions occupy a vertical plane. The end supports and handle portions are connected tangentially to the longitudinally outer surface of the adjacent end portion of the top border frame element 120 as by welding or the like, as indicated at 128 in Figure 21. At each end of each longitudinal runner 122 and connecting the runner to the adjacent vertically extending end support 124 is a reversely bent connector portion serving a plurality of functions. As best seen in Figure 22 the reversely bent connector portion includes a first laterally outwardly extending portion 130 which rests upon the top border frame element 120 of the next lower basket and also serves as an abutment engaging the longitudinally inner surface of the adjacent leg of the handle portion 126 of the next lower basket. At the outer end of the portion 130 there is an upwardly and longitudinally outwardly curved portion 130 which serves as an abutment for engagement with the laterally outer surface of the adjacent leg of the handle portion 126 of the next lower basket.

It will be observed that the curved handle portion 126 merges with the upper end of the end support 124 at a point substantially below the top border frame element 120 and that the curvature of the handle portion 126 is such that it is shaped to interfit snugly between the curved portions 132 provided at the lower ends of the end supports 124.

By the construction just described a single wire element may if desired be appropriately shaped to form the longitudinally extending runners 122, the vertically extending end supports 124, and the curved or looped handle portions 126. Moreover, this element by the shaping of the reversely bent connector portion intermediate the ends of the runners and the end supports, may serve as means for supporting an upper basket on the top border frame element of a lower basket, means for preventing relative longitudinal movement between the baskets by abutting the longitudinally inner surfaces of the handle portions directly above the top border frame element, and means for preventing relative lateral movement between the baskets by abutting the laterally outer surfaces of the handle portions of the next lower basket in the stack.

In Figure 11A there is illustrated a modified form of basket which is basically similar to the basket illustrated in Figures 7, 8 and 9, and to which corresponding reference numerals have been applied. The embodiment of the invention illustrated in Figure 11A differs from the embodiment of the invention illustrated in Figures 7–9 in that it includes a bar 47 extending between the vertical end supports 30 and secured to the outer surfaces thereof. The bars 47 are therefore spaced outwardly from the upturned end portions 46 of the runners 44 and include space therebetween into which the handle portions 28 of the next lower basket may be introduced. In this modification relative longitudinal movement between the baskets is prevented by bars 47 engaging the handles 28 of the next lower basket and by the upturned end portions 46 engaging the inner surfaces of the handles 28. However, the bars 47 have an additional function in that they prevent one end of a superposed basket dropping down within the next lower basket when the superposed basket is being raised or lowered with respect to the lower basket. It will be apparent that without the bar 47 if one end of the basket is raised the opposite end would be permitted to drop down within the lower basket. In the same way, as the superposed basket is being lowered, if one end is initially located inwardly from the end of the next lower basket, it could be lowered within the confines of the next lower basket. With the construction illustrated in Figure 11A this is prevented.

It will be observed that all of the modifications of the invention except those illustrated in Figures 10, 11 and 12, include means associated with the end supports to define a handle receiving pocket located adjacent the end of the basket, the pocket being open outwardly and downwardly from the basket to permit the relative movement of a handle portion upwardly thereinto.

The present invention is characterized by its simplicity, the economy with which it may be produced, but more particularly by its efficiency in use. Baskets of this general type are often employed in transporting finished machined parts to points of assembly and serve the dual purpose of facilitating transportation of the parts and also protection of the parts. For this purpose the detailed construction of the baskets may be modified to support the individual parts in protected relationship with each other. Thus for example, a possible use for baskets of this type would be in transporting finished gears subject to damage if allowed to come into haphazard contact with each other, in which case the separate gears might be individually supported on special means provided in the basket. Obviously, when the baskets are used with parts of this character it is essential that the baskets be constructed and arranged to permit stacking without introducing the possibility of instability in the stack.

Inasmuch as the weight of a basket and its contents may be very substantial it is also desirable to construct the baskets so as to facilitate stacking of the baskets and particularly to relieve an operator of at least a substantial portion of the weight of the basket as it is brought into registration with the next lower basket of the stack. Finally, it is important to prevent the baskets moving into an improper stacked relationship which superficially appears to be proper.

The present construction accomplishes all of the foregoing objects.

As previously described, the upper basket may be brought into very rough registration with the lower basket and a substantial portion of its weight is supported on a handle of a lower basket by permitting the intermediate runner to rest upon the lower handle. Thereafter, the upper basket comes into registration with the pocket at the end of the basket. Thereafter, the upper basket may be lowered and will assume proper transverse registration by virtue of the guiding action of the rounded handles of the lower basket and the spaced end supports of the upper basket. Moreover, the presence of the intermediate runner serves a second very important function in that it prevents the upper basket from being placed into approximate registration with a lower basket without actually being locked thereby against displacement. Experience has shown that unless baskets are provided with means which positively prevent approximate or apparent interlocking without actually effecting a true interlocking relationship, accidents will result. This is particularly true when the baskets are employed to transport heavy loads in which case the operator will move the upper basket into approximate registration without taking the trouble to insure that an actual interlock exists. It will be apparent from inspection that the intermediate runner prevents downward movement of the upper basket until the parts are in accurate longitudinal and transverse registration.

It will be noted that in some cases the transversely extending members serving as abutments for the handles of the next lower basket in the stack may be flat strips or bars, or round wires, and that each form has some advantages over the other. Unless otherwise specified, it will be understood that these members may be of any of the aforementioned types.

The drawings and the foregoing specification constitutes a description of the improved stacking basket in such full, clear, concise and exact terms as to enable any person skilled in the art to practice the invention, the scope of which is indicated by the appended claims.

What I claim as my invention is:

1. A wire basket adapted to stack with like baskets comprising a top border frame, wire handles secured tangentially to the outer surfaces of the mid-portion of the end sections of said top border frame, said handles each including a loop portion extending above the border frame and end support portions extending downwardly from the border frame to the bottom of the basket, the innermost surfaces of the end support portions of each handle adjacent the bottom of the basket being spaced apart a distance substantially equal to the spacing between the laterally outer surfaces of the handle portion directly above said border frame, the handle portion and end support portions of each handle being disposed substantially in a vertical plane, the handle portions of each basket being snugly receivable between the end support portions of a superimposed basket in a stack, a wire runner extending longitudinally of the basket at its bottom and midway between its sides, said runner having its ends upturned, the longitudinally outer surface of each of said upturned ends being located substantially in a plane tangent to the longitudinally inner surfaces of the adjacent pair of end support portions.

2. A basket as defined in claim 1 in which said upturned ends extend upwardly a distance sufficient to engage the mid-points of the handles of the next lower basket in a stack.

3. A wire basket adapted to stack with like baskets comprising a top border frame, wire handles secured tangentially to the outer surfaces of the mid-portion of the end sections of said top border frame, said handles including a loop portion extending above the border frame and end support portions extending downwardly from the border frame to the bottom of the basket, the innermost surfaces of the end support portions at each handle adjacent the bottom of the basket being spaced apart a distance substantially equal to the spacing between the laterally outer surfaces of the handle portion directly above said border frame, the handle portion and end support portions of each handle being disposed substantially in a vertical plane, the handle portions of each basket being snugly receivable between the end support portions of a superimposed basket in a stack, a wire runner extending longitudinally of the basket at its bottom and midway between its sides, said runner having its ends upturned and secured to the mid-points of the end portions of said top border frame said upturned ends being vertically coplanar with the end portions of said top border frame.

4. A wire basket adapted to stack with like baskets comprising a wire bent into rectangular shape to provide a top border frame, wire handles secured tangentially to the outer surfaces of the mid-portions of the end sections of said top border frame, said handles including looped portions extending above the border frame and end support portions extending downwardly from the border frame to the bottom of the basket, the innermost surfaces of the end support portions of each handle adjacent the bottom of the basket being spaced apart a distance substantially equal to the spacing between the laterally outer surfaces of the handle portions directly above said border frame, the looped portion and end support portions of each handle being disposed substantially in a vertical plane, the looped portions of each basket being snugly receivable between the end support portions of a superimposed basket in a stack, the lower ends of said end support portions being bent inwardly to provide a pair of continuous longitudinally extending runners interconnecting corresponding ones of the end supports at opposite ends of the basket, an intermediate runner disposed between said first mentioned runners having its ends turned upwardly to provide stop portions connected to said top border frame and occupying the vertical plane passing through the end sections of said top border frame, the upturned ends of said intermediate runner being engageable with the longitudinally inner surfaces of the handles of the next lower basket in a stack so as to prevent longitudinal displacement between such baskets.

5. A basket as defined in claim 4 which comprises an elongated element connected to the longitudinally outer end surfaces of the pair of end support portions at each end of the basket and extending therebetween, said element being disposed to bear against the longitudinally outer end surfaces of the looped portion of the next lower basket in a stack whereby the looped portion of each handle of the next lower basket in a stack is disposed between said elongated element and said stop element.

References Cited in the file of this patent

UNITED STATES PATENTS

| | | |
|---|---|---|
| 1,835,535 | Stocker | Dec. 8, 1931 |
| 1,922,605 | Spear | Aug. 15, 1933 |
| 2,023,886 | Hoffman | Dec. 10, 1935 |
| 2,223,554 | Davis | Dec. 3, 1940 |
| 2,364,705 | Geralds | Dec. 12, 1944 |
| 2,646,186 | Russell | July 21, 1953 |